Patented Nov. 11, 1930

1,781,204

UNITED STATES PATENT OFFICE

SAMUEL F. WALTON, OF HAMBURG, NEW YORK, ASSIGNOR TO THE EXOLON COMPANY, OF BLASDELL, NEW YORK, A CORPORATION OF MASSACHUSETTS

MOLDABLE PRODUCT AND METHOD OF PRODUCING THE SAME

No Drawing.   Application filed April 23, 1928.  Serial No. 272,349.

My present invention contemplates a new product of general utility for molded articles such as are now usually made from so-called condensation products and like materials.

Materials in accordance with my invention may be produced at low cost and have certain physical advantages which are imparted to the articles made from it.

While my invention is capable of some variations as to material and method, its principles may be illustrated by a characteristic product in which I utilize an ordinary condensation product base or material of like type with a body of porous material capable of being comminuted to any desired size and which may be embodied in the phenol resins in such a way as to become thoroughly incorporated therewith to form a mass which may be heated and molded as desired.

This product may be made in any color desired and for such color effects I proceed as follows. I use for a base or body for my product a silicate and for this purpose can utilize such a common and inexpensive material as furnace slag. Such a slag when comminuted furnishes a porous material of irregular surface. It is light and has a considerable structural strength and as a silicate offers an unusual possibility for a basis of bonding with an insoluble color vehicle such as a silicate.

In producing a color for such a material I use a soluble silicate such as water glass mixing with this a metallic oxide of the desired color. The slag particles are then kneaded into this color mixture and the whole dried out while the mass is being constantly stirred or agitated. When dried out the mass is then brought to a temperature not exceeding 500° C. This effects a chemical union of the silicate in the presence of the metallic oxide whereby an infusible glaze is deposited on the slag particles and in all the pores thereof. Such material then constitutes in itself a color or colored body which I embody in a phenol condensation product, such as phenol resin, which acts as a bond throughout the material and produces a product of novel and advantageous characteristics. In doing this I wet the colored slag before described with any suitable solvent, as furfurol, and add to this a phenol resin in finely powdered condition, mixing the mass thoroughly. Such a mixture may then be heated and molded under pressure as desired.

When removed from the mold the article is again heated to a sufficient temperature to harden the resin to its insoluble condition. Various phenol resins may be used, such for example as bakelite or carboloid, as they are commercially known, but for my purposes such resins should be of the clear type so that the color of the mass is not hidden by the resin.

The resultant product is characterized by lightness of weight, beauty and impermeability of color, fire retardance, and unusual tensile strength and resistance to shatter and shock.

What I therefore claim and desire to secure by Letters Patent is:

1. A moldable product, comprising a mixture of particles of finely divided slag, having a siliceous glaze, including a metallic oxide of definite color, and a phenol resin in bonding proportion thereto.

2. A material for molding, comprising a comminuted siliceous base, having an insoluble glaze, including a metallic oxide of definite color, and a phenol resin mixed therewith and in bonding relation thereto.

3. The method of utilizing slag having a siliceous glaze including a metallic oxide of definite color, which consists in mixing the comminuted slag with a solvent, mixing therewith a finely pulverized phenol condensation product, and molding the mix under the heat and pressure to shape, removing the shaped product from the mold, and reheating at a temperature sufficient to harden the phenol condensation product to an insoluble condition.

4. The method of utilizing slag having a siliceous glaze including a metallic oxide of definite color, which consists in mixing the colored slag with furfurol, mixing therewith a finely pulverized phenol condensation product, and molding the mix under heat and pressure to shape, removing the shaped product from the mold, and reheating at a temperature sufficient to harden the phenol condensation product to an insoluble condition.

5. The method of utilizing slag having a siliceous glaze including a metallic oxide of definite color, which consists in wetting the colored slag with furfurol, mixing therewith a finely pulverized phenol condensation product, and molding the mix under heat and pressure to shape, removing the shaped product from the mold, and reheating at a temperature sufficient to harden the phenol condensation product to an insoluble condition.

6. The method of producing a moldable product, which consists in mixing siliceous slag granules and a soluble silicate in which is incorporated an insolubilizing and coloring oxide which reacts with the soluble silicate in the presence of water to form an insoluble and colored glaze on the siliceous base, in adding a phenol condensation product, in molding the mix under heat and pressure to shape, in removing the shaped product from the mold, and reheating at a temperature to harden the phenol condensation product to an insoluble condition.

7. As a new product, siliceous slag granules colored with a soluble silicate, and an insolubilizing and coloring oxide reactive with the soluble silicate in the presence of water to form a chemical union of the silicate in the presence of the oxide whereby an infusible glaze is deposited on the granules, and a phenol condensation product in bonding proportions thereto.

In testimony whereof I affix my signature.

SAMUEL F. WALTON.